US009714831B2

(12) United States Patent
Kapoor et al.

(10) Patent No.: US 9,714,831 B2
(45) Date of Patent: Jul. 25, 2017

(54) TRAVEL PATH IDENTIFICATION BASED UPON STATISTICAL RELATIONSHIPS BETWEEN PATH COSTS

(71) Applicant: Microsoft Corporation, Redmond, WA (US)

(72) Inventors: Ashish Kapoor, Kirkland, WA (US); Debadeepta Dey, Redmond, WA (US); Andrey Kolobov, Seattle, WA (US); Semiha Ece Kamar Eden, Redmond, WA (US); Richard Caruana, Woodinville, WA (US); Eric Horvitz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/324,861

(22) Filed: Jul. 7, 2014

(65) Prior Publication Data
US 2016/0003620 A1 Jan. 7, 2016

(51) Int. Cl.
*G01C 21/00* (2006.01)
*G08G 5/00* (2006.01)
(Continued)

(52) U.S. Cl.
CPC ............. *G01C 21/00* (2013.01); *G01C 21/20* (2013.01); *G01C 21/3446* (2013.01);
(Continued)

(58) Field of Classification Search
CPC . G01C 21/34; G01C 21/3446; G01C 21/3453
See application file for complete search history.

(56) References Cited

U.S. PATENT DOCUMENTS

| 8,442,765 | B1 * | 5/2013 | Ingvalson | ......... G06F 17/30873 |
| | | | | 342/357.28 |
| 9,217,649 | B1 * | 12/2015 | Dror | ...................... G01C 21/00 |

(Continued)

FOREIGN PATENT DOCUMENTS

DE      WO 2014139821 A1 *  9/2014   ......... G01C 21/3453

OTHER PUBLICATIONS

Polychronopoulos, George and Tsitsiklis, John. "Stochastic Shortest Path Problems with Recourse." Networks, vol. 27 (1996) 133-143.*

*Primary Examiner* — John R Olszewski
*Assistant Examiner* — Jeffrey Boomer
(74) *Attorney, Agent, or Firm* — Medley, Behrens & Lewis, LLC

(57) ABSTRACT

Various technologies pertaining to dynamically identifying travel segments to be taken by a traveler traveling in a region are described herein, where observations about travel segments in the region are sparse and subject to alteration. A computer-implemented graph can be loaded into a memory, where the computer-implemented graph is representative of the region. The computer-implemented graph includes nodes that represent locations in the region and edges that represent travel segments of the region, where the edges have costs assigned thereto, and further where there is a defined statistical relationship between the costs. When an observation about a travel path is received, using the computer-implemented graph, inferences can be made about costs of traversing other travel paths in the region.

20 Claims, 10 Drawing Sheets

(51) Int. Cl.
*G08G 1/0968* (2006.01)
*G06Q 10/04* (2012.01)
*G01C 21/20* (2006.01)
*G01C 21/34* (2006.01)

(52) U.S. Cl.
CPC ..... *G06Q 10/047* (2013.01); *G08G 1/096827* (2013.01); *G08G 1/096844* (2013.01); *G08G 5/0008* (2013.01); *G08G 5/0021* (2013.01); *G08G 5/0039* (2013.01); *G08G 5/0078* (2013.01); *G08G 5/0091* (2013.01)

(56) References Cited

U.S. PATENT DOCUMENTS

| | | | | |
|---|---|---|---|---|
| 2009/0175171 A1* | 7/2009 | Nikolova | ................ | H04L 45/12 370/238 |
| 2011/0251789 A1* | 10/2011 | Sanders | ................ | G06Q 10/08 701/533 |
| 2011/0310088 A1* | 12/2011 | Adabala | ................ | G06T 19/003 345/419 |
| 2012/0158299 A1* | 6/2012 | Cerecke | ............. | G01C 21/3446 701/533 |
| 2012/0173136 A1* | 7/2012 | Ghoting | ................ | G08G 1/202 701/411 |
| 2013/0132369 A1* | 5/2013 | Delling | .............. | G01C 21/3446 707/716 |
| 2013/0282341 A1* | 10/2013 | Takahashi | ............ | G06Q 10/047 703/2 |
| 2013/0311089 A1* | 11/2013 | Freed | .................. | G01C 21/3423 701/533 |
| 2014/0005940 A1* | 1/2014 | Suzuki | ............... | G01C 21/3484 701/527 |
| 2014/0188788 A1* | 7/2014 | Bridgen | ............ | G01C 21/3423 707/609 |
| 2014/0324327 A1* | 10/2014 | Aragon | .................. | G01C 21/26 701/117 |
| 2015/0211871 A1* | 7/2015 | Jeong | ..................... | G01C 21/34 701/522 |
| 2015/0285651 A1* | 10/2015 | Cerecke | .............. | G01C 21/3446 701/533 |

* cited by examiner

TRAVEL PATH IDENTIFICATION BASED UPON STATISTICAL RELATIONSHIPS BETWEEN PATH COSTS

BACKGROUND

A problem faced by many travelers in the physical world relates to choosing a route between a source location and destination location. Several computer-implemented applications have been developed to assist travelers in making such choice. For example, computer-executable applications have been developed to identify a travel route between specified source and destination locations. These computer-executable applications utilize a graph to represent a road network, where road segments are represented by respective weighted edges. A weight assigned to an edge can be indicative of, for example, the expected amount of time it will take to travel over a road segment represented by the edge (e.g., which may be a function of a speed limit assigned to the road segment, expected traffic over the road segment, or a observed traffic over the road segment). The computer-executable application searches the graph for the route between the source location and the destination location that has the lowest aggregate cost from amongst all possible routes. The computer-executable application then outputs the identified route to a user.

There are many analogous applications, however, where it is difficult to ascertain weights to assign to edges in the graph prior to acquiring observations for these edges. As one of many examples, a robot may attempt to travel from a source location to a destination location over unexplored terrain in a region. For instance, the robot may have rough information about treacherous regions of the terrain that would risk slowing the robot, but may not have granular information about the entirety of the terrain. The robot, accordingly, must attempt to identify an optimal route to reach the destination location by using sparse data and observations captured by the robot as it travels. In another example, efficiency of air transport is sensitive to winds encountered over the course of a flight. Airplane pilots typically travel at a constant, recommended airspeed for their aircraft based upon engine, altitude, and weight. Given a fixed airspeed, tailwinds and headwinds increase and decrease, respectively the ground speed of aircraft. Pilots, in collaboration with air traffic control and in accordance with airline policies, establish and modify flight plans to avoid turbulence and to seek favorable winds.

Wind forecasts available for flight planning have conventionally been limited to the use of relatively coarse information, where wind speed and direction are detected by sparsely situated weather balloons. Linear interpolation has been employed to estimate wind directions and velocities in segments over which airplanes may travel. Thus, a region through which an airplane is capable of travelling can be modeled as a computer-implemented graph, wherein the graph has edges representative of travel segments, and the edges have weights that are respectively based upon estimated wind speeds and directions. Due to sparseness of sensors in the region, however, exact wind information is unavailable for many of the travel segments—thus, wind information for a travel segment may be unknown prior to an airplane traversing the segment.

Conventionally, the above-described graphs that represent real world travel routes have been assigned weights that are discrete and independent of one another. While this conventional approach is well-suited for applications where a large amount of sensor data has been collected and weights of edges are generally known, this approach is not particularly well-suited for identifying optimal routes in a region where collected data is somewhat sparse (and possibly subject to rapid change, such as wind speed and direction, water current speed and direction, etc.).

SUMMARY

The following is a brief summary of subject matter that is described in greater detail herein. This summary is not intended to be limiting as to the scope of the claims.

Described herein is a computer-implemented method, the method includes an act of updating a first cost distribution over a first edge in a computer-implemented graph based upon an observation about a first travel segment in a region, the first edge representative of the first travel segment. The method also includes updating a second cost distribution over a second edge in the computer-implemented graph based upon the cost distribution over the first edge and a statistical relationship between the first edge and the second edge, the second edge representative of a second travel segment in the region. The method further includes outputting an indication that a traveler is to travel over the second edge in the computer-implemented graph based upon the second cost distribution.

DETAILED DESCRIPTION

Figure 1:
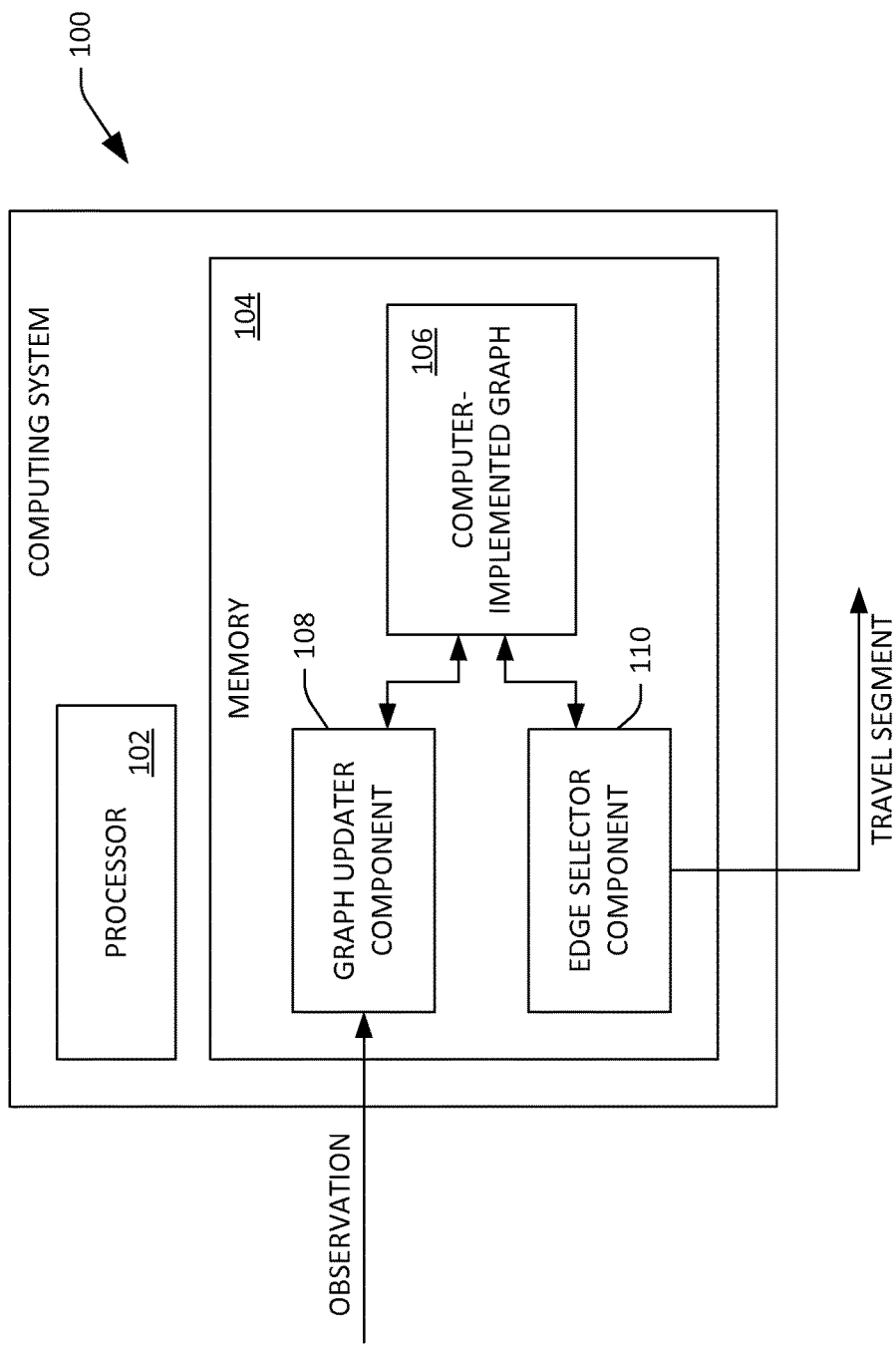
FIG. 1 is a functional block diagram of an exemplary computing system that is configured to dynamically optimize a travel route for a traveler in a region.

Various technologies pertaining to dynamically computing travel routes are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various technologies pertaining to dynamically updating a route a traveler travels in a region as the traveler navigates in the region, wherein the region includes multiple possible travel paths, and wherein observations about the travel paths in the region may be somewhat sparse. With more particularity, the traveler may desire to travel from a source location to a destination location in the region. The traveler can be, for example, an automobile, an airplane, a drone, a robot, a water vessel, a data packet traveling over a network, a human, etc. The region can be represented as a computer-implemented graph, where the graph includes nodes and edges. The nodes of the computer-implemented graph represent discrete locations in the region, and the edges represent travel segments between discrete locations. Thus, each node in the graph is connected to at least one other node in the graph by an edge.

The edges have respective costs assigned thereto. In an example, the costs can be given by respective functions representing, for instance, travel times along travel segments represented by the edges. In some cases, a function can receive unknown variables as input—e.g., in aircraft navigation, output of the function may depend on winds, where winds for many of the travel segments are unknown. Beliefs about manifestations of these unknown variables over numerous travel segments, however, can be represented with respective joint distributions, where a joint distribution can capture statistical relations estimated or learned to be present among distributions over costs of individual travel segments. Therefore, for instance, when an observation about one of the aforementioned variables is received about a first travel segment in the physical world, a cost assigned to a first edge in the computer-implemented graph that represents the travel segment can be updated. Since there is a statistical relationship between costs respectively assigned to the edges in the graph, the updated cost assigned to the first edge can be used to update beliefs about costs assigned to other edges—thus, uncertainty about the costs of the other edges can be collapsed based upon the observation over the first travel segment. In other words, based upon an observation about a travel segment in a region, inferences can be made regarding other travel segments in the region. As noted above, the above-referenced statistical relationship between costs of the edges can be a joint probability distribution over the costs of the edges. Further, in an example, the joint probability distribution may be a transformation of a Gaussian, which is well-suited for numerous natural phenomena, such as oceanic currents, traffic congestions levels, winds, etc.

Responsive to costs of edges being updated based upon at least one observation about a travel segment in the region, a travel route between a location of the traveler and the destination location can be identified. In an example, the observation can be generated by the traveler (e.g., the traveler makes observations about its surroundings as it navigates the region), the observation may be received from another traveler in the region, the observation may be received from a sensor in the region, multiple observations with regard to multiple different travel segments can be received, etc. In a non-limiting example, when the statistical relationship between costs of edges in the graph is a joint probability distribution, the joint probability distribution can be sampled to acquire discrete cost values for respective edges in the graph. The travel route through the computer-implemented graph with the lowest aggregate cost (e.g., sum of costs assigned to edges in the travel route) can be identified, and this cost can be assigned to the edge that represents the first travel segment in the route. This process can be repeated several times, and the traveler can be directed along a travel segment based upon the costs assigned to edges that represent respective travel segments that start from the location of the traveler. This process can be repeated as the traveler continues to travel in the region, such that the path to the destination location is dynamically updated.

With reference now to FIG. 1, an exemplary computing system 100 that is configured to dynamically direct a traveler over a travel route in a region is illustrated. As used herein, region refers to an area in the physical world through which a traveler can travel. A travel route refers to a route between a location of a traveler and a destination location in the physical world. A travel route can include multiple connected travel segments, which collectively form the travel route. A travel segment is a segment between discrete locations in the region. Generally, the technologies described herein are directed towards directing the traveler to the destination location, where multiple potential travel routes exist between the location of the traveler and the destination location. The traveler can be a human, an airplane, an automobile, a water vessel, a drone, a robot, a data packet being transmitted over a network, a human, or the like. As will be described in greater detail herein, the computing system 100 is configured to dynamically direct the traveler over travel segments in the region as observations about travel segments in the region are received. Such observations can be received from the traveler, from a sensor in the region, from another traveler in the region, etc.

The computing system 100 includes a processor 102 and a memory 104 that is in communication with the processor 102 (e.g., by way of a bus). The memory 104 can have a computer-implemented graph 106 stored therein, wherein the computer-implemented graph 106 is representative of a region through which the traveler is travelling or will travel in the future. With more particularity, the computer-implemented graph 106 can include representations of discrete locations in the region, as well as travel segments between such locations. The memory 104 additionally includes a graph updater component 108 that is configured to receive observations about travel segments in the region and update the computer-implemented graph 106 based upon such observations. As will be described in greater detail below, the graph updater component 108 can update a joint distribution (belief) over a phenomenon that influences costs for traversing travel segments, and hence the distribution over costs for traversing the travel segments themselves. Further, the graph updater component 108 can be configured to dynamically update the computer-implemented graph 106 as observations about travel segments in the region are received. The memory 104 can also include an edge selector component 110 that is configured to identify a travel segment (which is connected to the current location of the traveler) over which the traveler is to travel to reach the destination location. The edge selector component 110 can be configured to dynamically select travel segments as the traveler navigates in the region.

Figure 2:
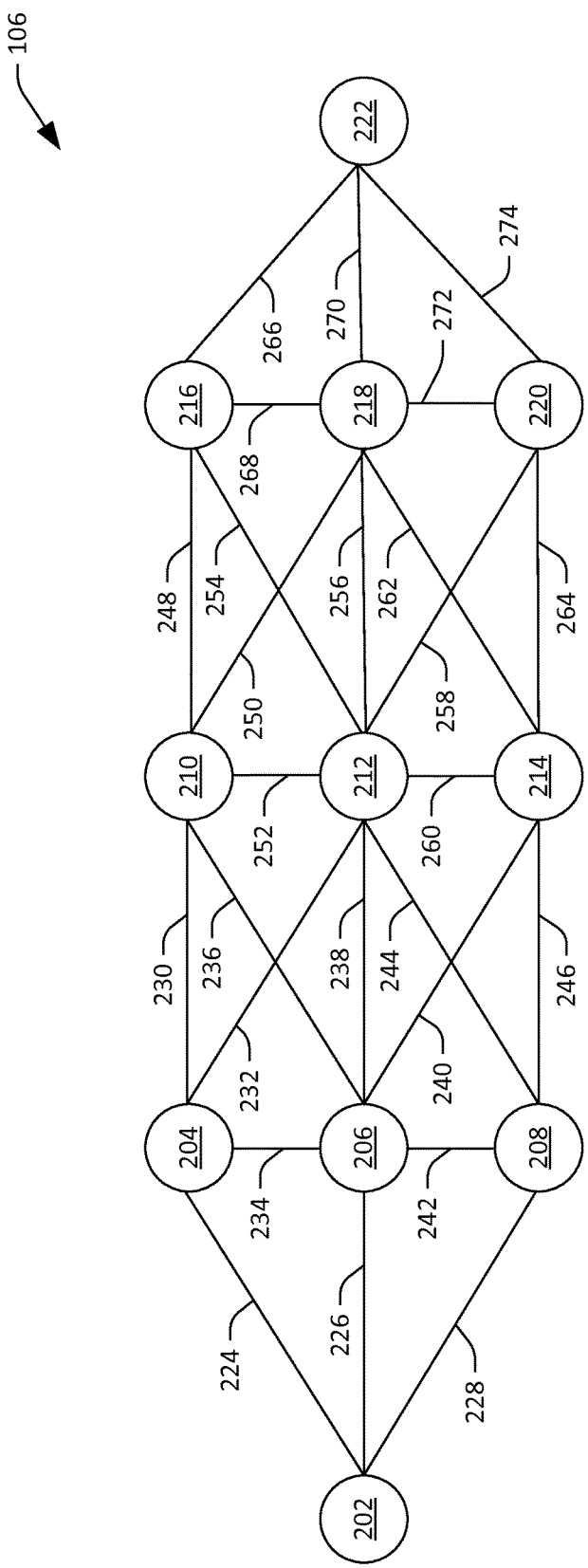
FIG. 2 illustrates an exemplary computer-implemented graph that can be employed by the computing system of FIG. 1.

Referring briefly to FIG. 2, an exemplary depiction of the computer-implemented graph 106 is illustrated. The computer-implemented graph 106 includes a plurality of nodes 202-222. The plurality of nodes 202-222 are representative of respective locations in the region that includes the traveler. The computer-implemented graph 106 also includes a plurality of edges 224-274 that represent respective travel segments in the region (travel segments between locations in the region represented by the nodes 202-222).

As can be ascertained, each edge in the edges 224-274 connects a respective pair of nodes. For example, the edge 224 connects the node 202 and the node 204, and thus represents a travel segment between the location represented by the node 202 and the location represented by the node 204. In another example, the edge 256 connects the node 212 with the node 218, and therefore represents a travel segment between the location represented by the node 212 and the location represented by the node 218. The edges 224-274 are assigned respective costs, which are representative of respective costs that will be incurred by the traveler when the traveler traverses over the travel segments respectively represented by the edges 224-274. Thus, for example, the edge 224 has a cost assigned thereto that represents a cost to the traveler of traveling over the travel segment represented by the edge 224. For instance, a cost assigned to an edge can be representative of an expected amount of time that it will the traveler to travel over the travel segment represented by the edge. In another example, the costs can be representative of monetary costs. Other costs are also contemplated.

Further, the costs can be given by respective functions representing, for instance, travel times along travel segments represented by the edges 224-274. In some cases, a function can receive variables (with unknown values) as input—e.g., in aircraft navigation, output of the function may depend on winds, where winds for many of the travel segments are unknown. Beliefs about manifestations of these unknown variables over numerous travel segments, however, can be represented with respective joint distributions, where a joint distribution can capture statistical relations estimated or learned to be present among distributions over costs of individual travel segments. Therefore, acquisition of information about one travel segment in the region can allow for inferences to be made about another travel segments in the region. As noted above, such statistical relationship can be a joint probability distribution over the costs of the respective edges 224-274 in the computer-implemented graph 106. For instance, the joint probability distribution can be a transformation of a Gaussian distribution, which is particularly well-suited for representing natural phenomenon (e.g., where a natural phenomenon is one that impacts the traveler but over which the traveler has no control), such as winds, ocean currents, etc.

While the graph 200 is illustrated as including discrete nodes, it is to be understood that the region represented by the graph 200 can be represented as a continuous plane over which a traveler can travel.

Returning to FIG. 1, operation of the computing system 100 will now be described. The traveler is at a location in the region (e.g., a location represented by the node 202 in the computer-implemented graph 106). The graph updater component 108 receives at least one observation about a travel segment in the region, and maps the at least one observation to an edge in the computer-implemented graph 106, where the edge represents the travel segment. In an example, the observation can be received from a sensor of the traveler (e.g., a velocity sensor, a directional sensor, a light sensor, a clock, etc.). In another example, the observation can be received by way of manual input (e.g., the traveler may be human, and can manually input an observation about a travel segment, such as a travel segment represented by one or more of edges 224, 226, and 228). In yet another example, the observation can be received from a sensor that is located in the region represented by the computer-implemented graph 106. For instance, the traveler can be at the location represented by the node 202, and the above-referenced sensor can be proximate to or at a location in the region represented by the node 216. In yet another example, the observation can be received from another traveler traveling in the region represented by the computer-implemented graph 106. For instance, the traveler may be an airplane flying in an airspace, and the observation can be about a wind velocity and direction observed by another airplane at a different location in the airspace. Furthermore, the observation itself may have some amount of uncertainty corresponding thereto. For example, the observation can be an image acquired from a camera, where certainty about the observation can change as depth of an entity in the image increases. This uncertainty can be expressed in the observation, and, for example, the uncertainty can be indexed by some parameter, such as distance.

The graph updater component 108, responsive to mapping the observation to an edge in the computer-implemented graph 106, updates a cost assigned to the edge. Practically, the observation reduces uncertainty about the true cost of the traveler traveling over the travel segment about which the observation has been made. The graph updater component 108 can, thereafter, dynamically update a distribution of the cost assigned to the edge to represent this reduction in uncertainty. Furthermore, as the costs assigned to edges have a defined statistical relationship therebetween, distributions over costs assigned to other edges in the computer-implemented graph 106 can be updated based upon the observation. Specifically, a distribution over the cost assigned to the edge can be updated, and using such updated distribution, distributions over costs assigned to other edges in the computer-implemented graph 106 can be updated, representing collapsing of uncertainties of costs in the physical world. The graph updater component 108 can dynamically update distributions over costs assigned to respective edges in the computer-implemented graph 106 as observations about travel segments are received.

The edge selector component 110 can access the computer-implemented graph 106 (with updated distributions), and can identify a travel route that the traveler is to take to reach the destination location based upon the cost distributions respectively assigned to the edges. The travel route includes a first travel segment to be taken by the traveler in the route (from the current location of the traveler), and the edge selector component 110 can select an edge that represents the first travel segment. Thereafter, for example, the edge selector component 110 can output a signal that causes the traveler to travel over the first travel segment.

The edge selector component 110 can utilize a variety of techniques for identifying the edge, and thus the travel segment to be taken by the traveler. In an example, the edge selector component 110 can cause discrete cost values to be generated and assigned to respective edges in the computer-implemented graph 106. The edge selector component 110 may then employ a suitable search algorithm to identify a route in the computer-implemented graph 106 between the node that represents the current location of the traveler (e.g., the node 202) and the node that represents the destination location (e.g., the node 222). The edge selector component 110 can identify the route as being the route with the lowest aggregate cost from amongst all possible routes. This cost can then be assigned to the first edge in the route between the node 202 and the node 222. The edge selector component 110 can repeat this process numerous times, such that, for example, multiple cost values may be assigned to each of the edges 224, 226, and 228 (in this example). The edge selector component 110 may then select the edge having the lowest average cost value, may select the edge having the lowest of any cost value, may select the edge having a lowest amount of variance in cost values, etc.

In yet another example, the edge selector component 110 may select the edge based upon a known deadline of the traveler. For example, the traveler may be an airplane that has a particular predefined arrival time at the destination location represented by the node 222. While it may be beneficial for the airplane to arrive early at the destination location, it is more beneficial to ensure that the airplane does not arrive late to the destination location. In such an example, the edge selector component 110 can be configured to identify a route in the computer-implemented graph 106 that has the highest probability assigned thereto (from amongst all possible routes) of not having an aggregate cost above a threshold. Other approaches for identifying a route, and thus selecting a next travel segment of the traveler, are also contemplated.

Figure 3:
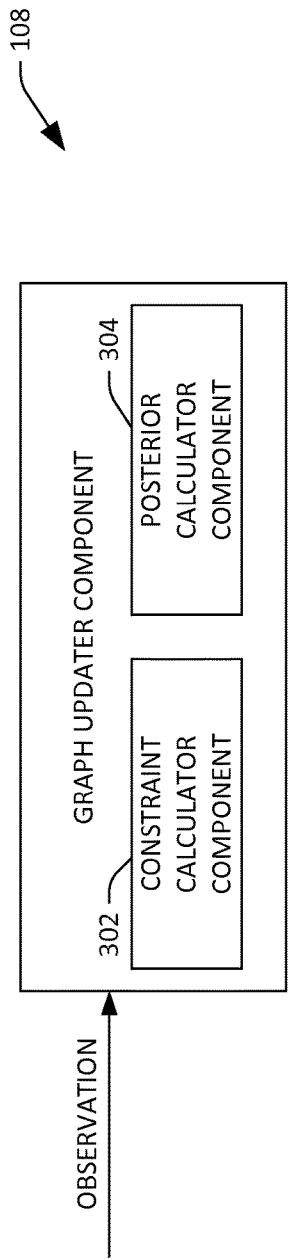
FIG. 3 is a functional block diagram of an exemplary graph updater component that updates costs respectively assigned to edges in a computer-implemented graph based upon an observation made in the physical world.

With reference now to FIG. 3, a functional block diagram of the graph updater component 108 is illustrated. The operation of the graph updater component 108 will be described in the context of a Canadian Traveler Problem (CTP). A CTP is concerned with a traveler getting from a source node $v_o$ to a goal node $v_g$ in a graph $G = \langle V, E \rangle$ whose edges have unknown costs and/or traversability. Since impassability of an edge can be modeled by assigning the edge a very high cost, CTPs will be discussed only from the standpoint of their cost structure.

In most CTP formulations, in order to optimize the cost of reaching $v_g$ from $v_o$, a traveler must reason about the joint edge cost realizations possible for the given problem. A joint edge cost realization $C: E \to \mathbb{R}^+$ is an assignment of costs to all of the travel segments represented by the computer-implemented graph 106. The traveler may be aware of the set $\mathcal{R}$ of all possible joint cost realizations before the traveler starts navigating in the region. In addition, the traveler can know a prior probability distribution P over the set $\mathcal{R}$. P allows the traveler to hypothesize a priori about the costs of different travel segments. In such a scenario, however, the traveler can identify an actual cost of a travel segment only once it is at one of the endpoints of the travel segment or attempts to traverse the travel segment.

Based on the observed cost of the travel segment, the traveler updates the distribution P by eliminating (or assigning a low probability to) the joint cost assignments that do not agree with the acquired observation. Thus, a CTP can be formalized as a tuple $\langle V, E, v_o, v_g, P_0, \mathcal{R} \rangle$ of the above components. Solving a CTP involves, for example, computing a policy to reach the destination while incurring the lowest cost.

Pursuant to an example, the graph updater component 108 can employ a Gaussian Process (GP) in connection with updating costs assigned to edges of the computer-implemented graph 106. A GP is a distribution over functions that respect certain smoothness constraints and agree well with observations. The graph updater component 108 can employ a GP to define a statistical relationship between costs assigned to edges of the computer-implemented graph 106. For example, the graph updater component 108 can use a GP to model spatially and/or temporally correlated phenomenon, such as wind speed and direction, water current speed and direction, traffic flow over a road network, data traffic flow through a data network, etc.

GPs are well-suited for use in identifying travel routes in regions with sparsely located observations. As GPs provide a probabilistic framework, where uncertainty in the value of a function output (e.g., uncertainty of wind speeds in travel segments that have yet to be visited) can be modeled conditioned on observations made on travel segments where observations have been made. For example, a GP can consider the observed wind vector t for a location x to be a noisy version of a latent variable y. In an example pertaining to wind speed and direction, y can be the true predominant wind strength and direction at location x during a given time period and t, a noisy vector of the wind that is observed directly. Specifically, the relationship between y and the observation t can be characterized by the following Gaussian likelihood model:

$$p(t|y) = \frac{1}{\sqrt{2\pi\sigma^2}} e^{-\frac{(t-y)^2}{2\sigma^2}} \quad (1)$$

where $\sigma^2$ is the noise model variance. Thus, GPs assume the observations to be generated from hidden variables by corrupting values of these variables with a 0-mean Gaussian noise.

The graph updater component 108 includes a constraint calculator component 302 that can impose a smoothness constraint on the above-referenced latent variables. With more particularity, GPs imposes a smoothness constraint on the latent variables values by defining a probabilistic relationship between any finite set of locations $X = \{x_1, \ldots, x_n\}$ and the corresponding latent variables $Y = \{y_1, \ldots, y_n\}$ s.t. the distribution $p(Y|X)$ gives higher probability to wind vector fields that respect some notion of similarity between locations. Intuitively, then, GPs represent the assumption that similar travel segments should have similar observations. To reflect this, the similarity between two locations (or travel paths) in the region $x_i$ and $x_j$ can be defined using a kernel function: $k(x_i, x_j)$. The constraint calculator component 302 can use the kernel function to enforce the smoothness constraint. For example, the constraint calculator component 302 can let $p(Y|X)$ be a Gaussian (e.g., $p(Y|X) \sim N(0, K)$), where K is an n×n kernel matrix.

The graph updater component 108 also includes a posterior calculator component 304, which can compute a posterior probability to employ when assigning respective costs to the edges 224-274 in the computer-implemented graph 106. For example, the graph updater component 108 may have received observations $t_L = \{t_1, \ldots, t_m\}$ about some locations (e.g., travel segments), $x_1, \ldots, x_m \in X$ represented by edges in the computer-implemented graph 106. The posterior calculator component 304 can compute the hypothesis posterior $p(Y|X), t_L$ by combining the smoothness constraints $p(Y|X)$ computed by the constraint calculator component 302 and the information provided by the observations by way of $p(t_L|Y)$.

$$p(Y|X,t_L) \propto p(Y|X) p(t_L|Y) = p(Y|X) \prod_{i=1}^{m} p(t_i|y_i) \quad (2)$$

As Eq. (2) shows, the posterior is a product of Gaussians, and hence, is a Gaussian itself. The graph updater component 108, for each edge that fails to have an observation corresponding thereto, can compute the parameters of this Gaussian as follows:

$$\bar{y}_u = k(x_u)^T (\sigma^2 I + K_{LL})^{-1} t_L \quad (3)$$

$$\Sigma_u = k(x_u, x_u) - k(x_u)^T (\sigma^2 I + K_{LL})^{-1} k(x_u) \quad (4)$$

Here $k(x_u)$ is the vector of kernel function evaluations with the m observed travel locations in X; $K_{LL} = \{k(x_i, x_j)\}$ is the m×m data covariance over the observed locations, and $\sigma^2$ is the noise variance. Moreover, for every unobserved location, a posterior can be computed for the observations, which is also Gaussian and has the form $p(t_u|X,t_L) \sim N(\bar{y}_u, \Sigma_u + \sigma^2)$.

The problem where the traveler makes observations (the traveler gradually collects information about travel segments costs as it navigates the region) is known to be equivalent to instances of Partially Observable Markov Decision Processes (POMDPs). Generally POMDPs are a framework for describing planning scenarios where the objective of the traveler is to maximize reward or minimize incurred costs by choosing actions based on partial information about the current world state. In the case of CTPs, the objective function is the expected cost of getting from the source location to the destination location in the region. Goal-oriented POMDPs that describe such settings are tuples $\langle S, A, T, C, G, Z, O, b_0 \rangle$, where S is a set of world states; A is a set of actions the traveler can perform; T: S×A×S→[0,1] is a transition function that gives the probability of transitioning from a state s to a state s' when the traveler executes action a; C: S×A×S→$\mathbb{R}^+$ is a cost function specifying the cost the traveler incurs when transitioning from s to s' using a; $G \subseteq S$ is a set of goal states the traveler is attempting to reach; Z is a set of possible observations indicative of the current world state; O: S×A×Z→[0,1] is an observation function giving the probability of getting the particular observation z when the traveler executes action a and ends up in state s; and $b_0$ is a distribution over world states characterizing the initial belief of the traveler about the state where the traveler starts. The traveler has no direct knowledge of world states, but can infer beliefs about them by analyzing observations it acquires when executing various actions. Solving a POMDP means finding a (Markovian deterministic) policy π: B→A that recommends actions based on the current belief of the traveler.

The variant of CTP described above can be converted to a goal-oriented POMDP. The purpose of performing such a conversion is to make CTPs amenable to machinery that has been developed for solving POMDPs. A solution for a POMDP can be computed with dynamic programming, but doing so is P-space complete. To address this intractability, it has been proposed to use various approximate solution methods, such as the approaches derived from point-based value iteration and Monte Carlo planning.

As referenced above, a traveler may experience a phenomenon that interferes with the actions of the traveler, but which the traveler cannot control. A phenomenon exhibiting these characteristics (interference with traveler actions but outside of the control of the traveler) can be referred to herein as a natural dynamic. In an example, natural dynamics can be described statistically, such as by way of a Gaussian process. Thus, although stochastic relationships between edge costs in general CTPs are difficult to concisely characterize, GPs address this issue in many cases. CTPs that exploit this characterization by having GPs as an inherent component of the problem definition are set forth herein.

First, GP(0, k, $\sigma^2$) can denote a Gaussian process with zero mean, k can denote kernel function, and $\sigma^2$ can denote observation noise variance. A Gaussian traveler problem (GTP) may then be defined as follows: a (GTP) is a tuple $\langle V, E, v_0, v_g, \mathcal{W}, k, \sigma^2, C \rangle$, where V, E, $v_0$, and $v_g$ are as defined above; $\mathcal{W}$ is a set of joint natural dynamics realizations W: E→$\mathbb{R}_n$, each of which maps all edges to the values of natural dynamics on those edges; k: E×E→$\mathbb{R}$ is a kernel function encoding the similarity between any two edges; $\sigma^2$ is the variance of the natural dynamics observation noise; and C: (E→$\mathbb{R}_n$)→($\mathbb{R}^+$)$^{|E|}$ is an invertible dynamics-dependent cost function that maps joint natural dynamics realizations to joint assignments of positive costs to all edges. Solving a GTP means finding a policy π with the least expected cost of leading the agent from $v_o$ to $v_g$, given that the prior distribution over joint edge cost realizations is C(W), where W~GP(0, k, $\sigma^2$) is a random variable with domain $\mathcal{W}$.

The GTP definition differs from that of CTP only in the formalization of the prior belief over joint edge cost realizations. In particular, GTP views an edge cost realization (e.g., edge traversal times) as being generated from a realization W (e.g., wind vectors in the vicinity of every edge), which, in turn, is generated by the GP-governed natural dynamics of the problem (the probabilistic model that describes wind correlations at different locations). As in many existing CTP flavors, it can be assumed that a particular natural dynamics realization, and hence, a joint edge cost realization, has been chosen by nature by the time a traveler starts acting and remains fixed until the traveler reaches the goal. Thus, the traveler only needs to uncover the chosen cost realization by observing costs on various edges (which are guaranteed to remain unchanged once observed) and updating the GP that describes the underlying natural phenomenon. Note, however, that in order to update the GP using an edge cost observation, the traveler needs to infer the value of the observation on that edge from the observed edge cost. The requirement of the cost function's invertibility in the GTP definition guarantees that this is possible.

Although GPs provide a convenient tool for representing beliefs about true edge cost, they do not provide a policy that tells a traveler how to act depending on these beliefs. GTPs can be formalized as a goal POMDP, and POMDP algorithms can be adopted to compute approximate GTP solutions.

Figure 4:
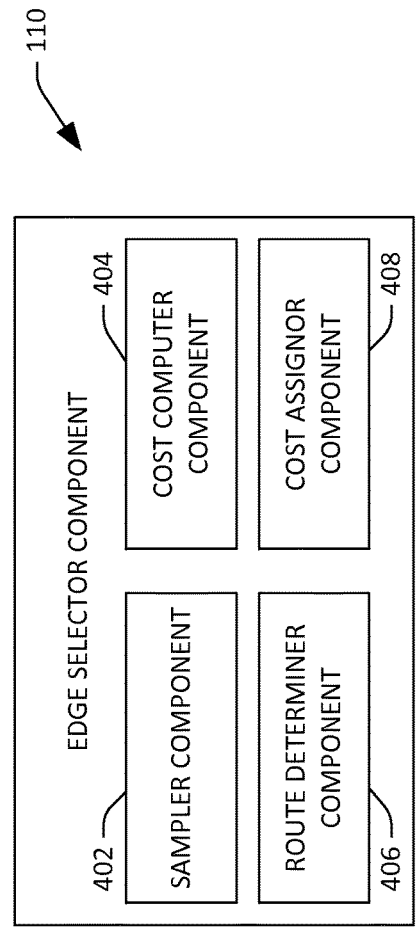
FIG. 4 is a functional block diagram of an exemplary edge selector component that is configured to identify a travel segment over which a traveler is to travel, the travel segment being the first travel segment between a location of the traveler and a destination location.

Now referring to FIG. 4, a functional block diagram of the edge selector component 110 is illustrated. The edge selector component 110 can be configured to take a determinization-based approach when selecting an edge, which represents a travel segment over which the traveler is to travel. It is to be noted that GPs that are used to model the underlying natural dynamics reduce to multivariate Gaussian distributions for graphs with finite numbers of edges. The edge selector component 110 can include a sampler component 402 that can sample from this distribution. Each sample from the Gaussian distribution is a joint natural dynamics realization (e.g., a discrete hypothetical observation for every edge). In an example, when the traveler is an airplane, converting wind vectors (acquired by sampling) to costs (time of travel along the travel segment) for a fixed aircraft airspeed yields a deterministic planning problem on the same graph. A cost computer component 404 can convert such observations to costs, and can assign the costs to respective edges of the computer-implemented graph 106. By generating many such samples from the GP representing the current belief about the winds and solving them, the expected cost to goal for each available action choice at the current location of the aircraft can be estimated.

With more particularity, the edge selector component 110 can include a route determiner component 406 that identifies a lowest-cost route through the computer-implemented graph 106 based upon the costs computed by the cost computer component 404. The cost assignor component 408 can assign a lowest-cost to the first edge in the computer-implemented graph 106 taken in the lowest-cost route through the graph 106. The sampler component 402, the cost computer component 404, the route determiner component 406, and the cost assignor component 408 can repeat these actions some threshold number of times until edges corresponding to the node that represents the current location of the traveler have a sufficient number of costs assigned thereto to allow for one of the routes to be deterministically chosen. An exemplary algorithm set forth below illustrates these actions.

---

Algorithm 1 Replan by Sampling

Require: $v_o$, $v_g$, V, E, k, C, GP(0,k,$\sigma^2$), n
1:  $v = v_0$
2:  while $v \neq v_g$ do
3:      $\{W\}$ = Sample(GP(0,k,$\sigma^2$),n)
4:      for each a in NeighboringEdges(v) do
5:          Q(v,a) = EstimateQ($\{W\}$,v,a)
6:      end for
7:      $a^*$ = $\text{argmin}_a$ Q(v,a)
8:      v = Traverse($a^*$,v)
9:      z = ReceiveNewObservation(v)
10:     GP(0,k,$\sigma^2$) = UpdateGP(GP(0,k,$\sigma^2$)z)
11: end while

---

Algorithm 2 EstimateQ

Require: $\{W\}$, v, a, $v_g$
1: Q = 0
2: for each C(W) in $\{W\}$ do
3:     v' = Neighbor(a, v)
4:     q = Dijkstra (v', $v_g$, C(W))
5:     Q = Q + q
6: end for 7: return $Q = \dfrac{Q}{|\{W\}|} + c(v, v')$

---

The inputs to the algorithm are the components of a GTP, including a GP with a kernel trained initially using available weather stations and a number of samples n to be generated at each step. At the initial node (the node in the computer-implemented graph 106 that represents the current location of the traveler), the algorithm samples the GP n times to produce n separate natural dynamics realization in the set $\{W\}$ (line 3). Then, each available immediate actions (edge's) Q-value is estimated by running a deterministic shortest path algorithm on each sampled realization (lines 4 and 5). The action with the least estimated cost to goal is chosen for execution (line 8). A new observation z is obtained in (line 9) and the GP is updated with the new observation (line 10) (e.g., using Eqs. (3) and (4)). This process can be repeated until the goal node is reached. Due to its probabilistic nature, this algorithm accounts for uncertainty in observation prediction naturally modeled by the GP. Instead of following a fixed policy, the algorithm continuously re-plans through execution by incorporating new observations the traveler makes (or received from elsewhere in the region) as the traveler moves through the region.

Figure 5:
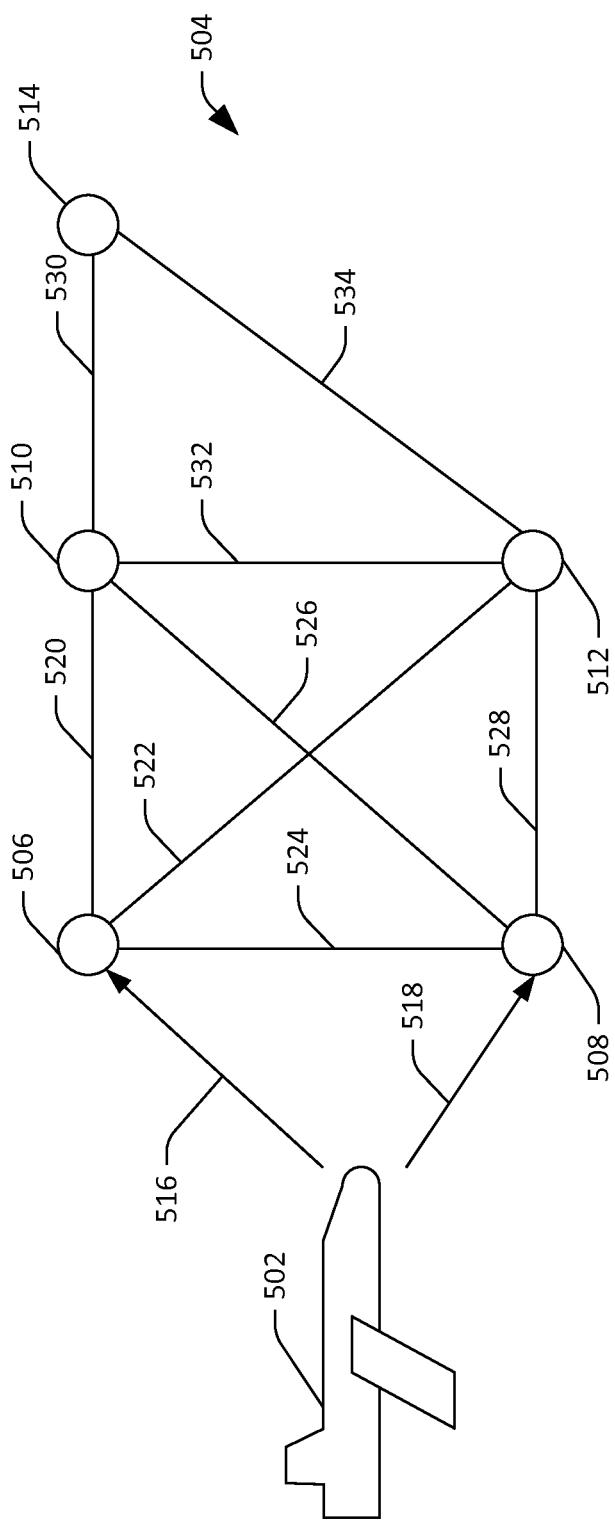
FIG. 5 illustrates an airplane traveling through an airspace.

With reference to FIG. 5, an exemplary practical application of concepts described above is illustrated. FIG. 5 illustrates that an airplane 502 at location $v_o$ is traveling in a region 504 (e.g., in an airspace). The region 504 includes $v_o$ and several other locations 506-514, wherein the airplane 502 desires to reach the location 514 (e.g., location 514=$v_g$). The region 504 also includes several travel segments 516-534, wherein the travel segments 516-534 connect locations in the region 504. For example, the travel segment 516 connects the current location of the airplane 502 ($v_o$) to the location 506, and the travel segment 518 connects the current location of the airplane 502 to the location 508.

As indicated previously, the region 504 can be represented by a computer-implemented graph (e.g., the computer-implemented graph 106). As the airplane 502 travels in the region 504, the airplane 502 can generate observations about natural dynamics, such as wind velocities and respective directions. Additionally, weather balloons, other sensors, and/or other airplanes may exist in the region 504, and may also generate observations about the natural dynamics pertaining to travel segments in the region 504. Based upon observations about the natural dynamics about travel segments, a joint probability distribution over edge costs can be estimated with respect to travel segments about which observations have been received, and inferences about costs can be made for other travel segments in the region 504. That is, for example, costs based upon wind velocities and directions in the region 504 can be modeled using a joint probability distribution. Based upon inferences made about costs over travel segments in the region 504 (e.g., based upon the joint probability distribution over costs), a determination can be made as to whether the airplane 502 should take 1) the travel path 516 (to the location 506) to reach the destination location 514; or 2) the travel path 518 to reach the destination node 514. The determination can be made by a computing system located in the airplane 502 itself, or by a computing system located at a control station that is in communication with the airplane 502.

Figure 6:
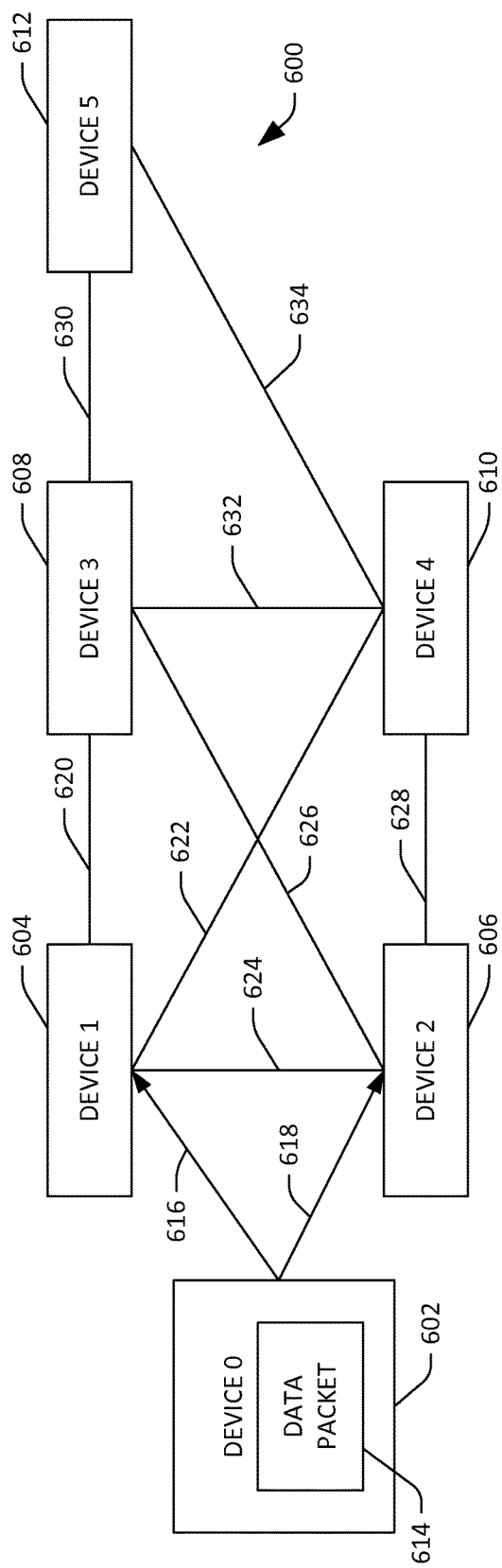
FIG. 6 illustrates a data packet traveling over a network.

Now referring to FIG. 6, another exemplary practical application of aspects described herein is illustrated. FIG. 6 illustrates an exemplary communications network 600 that includes multiple devices 602-612 that are configured to receive and transmit data packets. In an example, the devices 602-612 may include switches, routers, servers, etc. Device 0 (602) ($v_o$) includes a data packet 614 that is to be transmitted to the fifth device 608 ($v_g$). The communications network 600 includes several network links 616-634. Each link in the links 616-634 couples a pair of devices in the devices 602-612. The communications network 600 can be represented by a computer-implemented graph with nodes of the graph representing the devices 602-612 and the edges representing the network links 616-634 between the devices. Costs associated with the links may be bandwidth consumed on the links, traffic volume over the links, time of traversal over the links, etc.

In the exemplary scenario, the data packet 614 is the traveler and it may be desirable to identify a policy to use when directing data packets through the communications network 600. As the data packet 614 travels through the communications network 600, observations can be generated about one or more of the links 616-634. For example, a time of traversal over a network link can be computed based upon timestamps assigned to the data packet 614 as the data packet 614 travels through the communications network 600. Using this observation, inferences can be made about cost distributions over other links in the communications network 600, and a policy can be computed for further directing the data packet 614 through the communications network 600. In addition, the policy can be used for other data packets—e.g., routing tables can be updated periodically based upon such policy.

Figure 7:
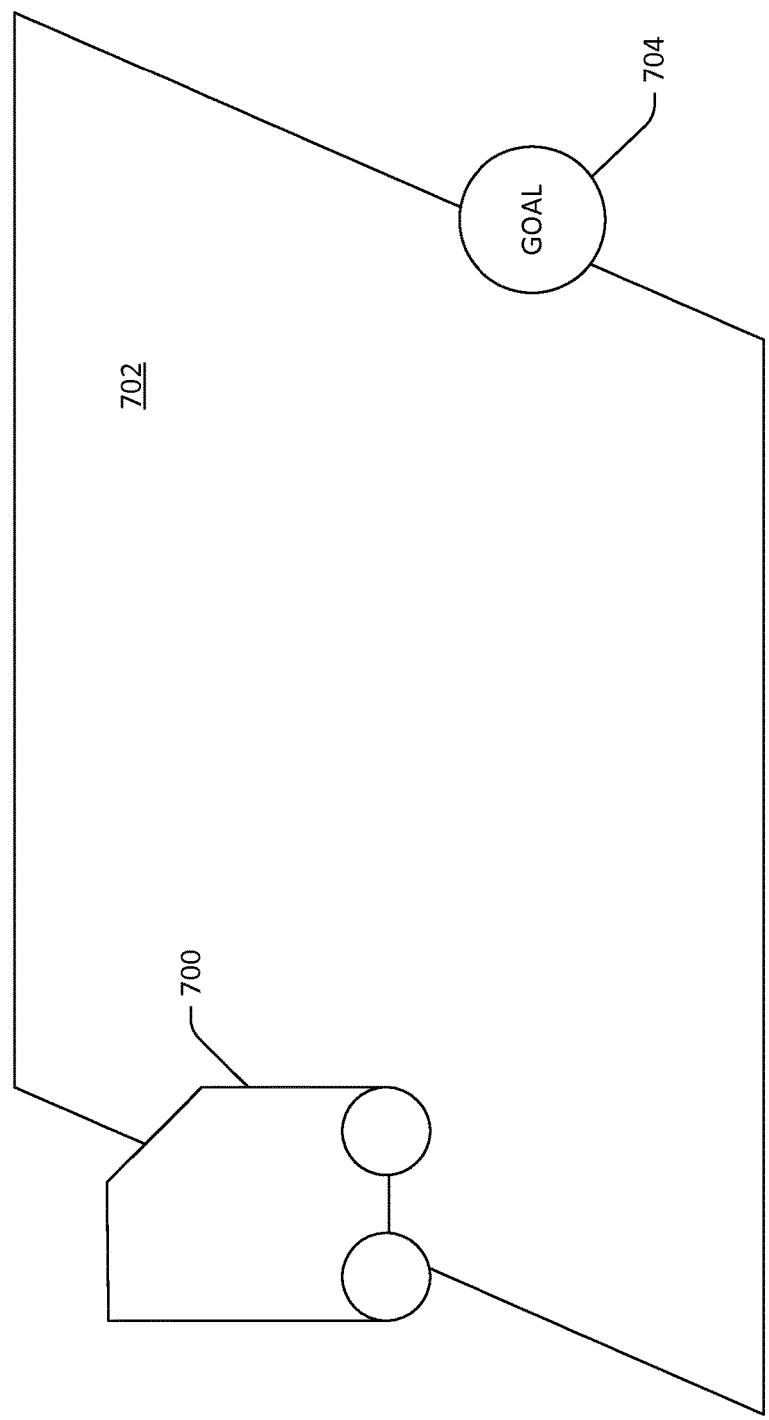
FIG. 7 illustrates a robot traveling through a region.

Now referring to FIG. 7, yet another exemplary practical application of the technology described herein is illustrated. The FIG. 7 indicates that a robot 700 is traveling in a region 702 with potentially unknown traversibility. The robot 700 intends to reach a goal 704 in the region 702. The region 702 can be represented as a computer-implemented graph (e.g., the computer-implemented graph 106), where nodes of the graph represent discrete locations in the region 702 and edges represent travel paths between discrete locations. As the robot 700 navigates in the region 702, inferences can be made about the traversibility of the travel segments represented in the computer-implemented graph. As the robot 700 travels in the region 702, these inferences can be updated based upon observations made by the robot 700, and a travel route can be dynamically updated until the robot 700 reaches the goal 704.

Figure 8:
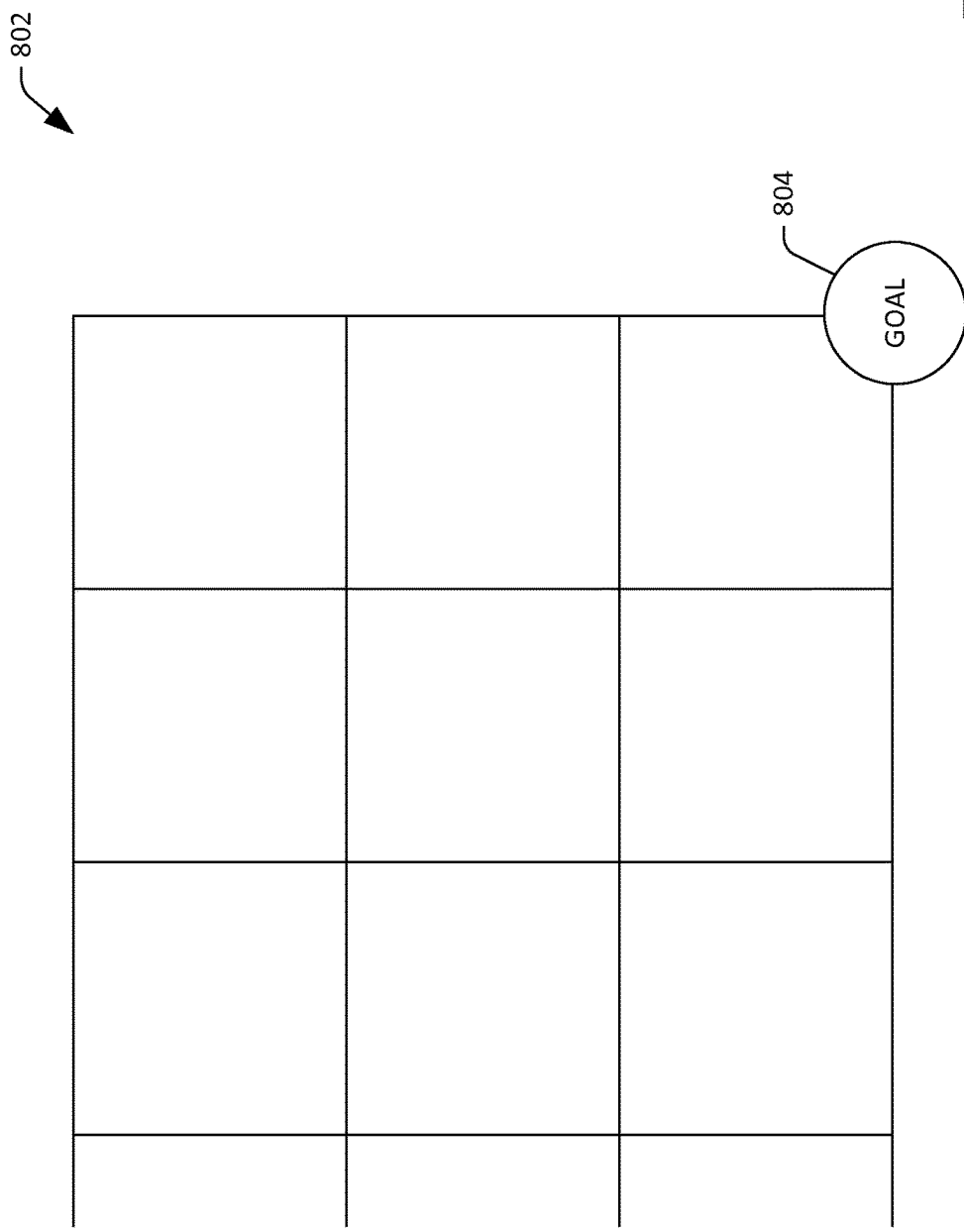
FIG. 8 illustrates an automobile traveling in road network.
Figure 8:
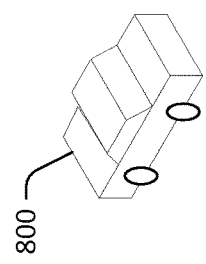

FIG. 8 depicts yet another practical application of the technology described herein. An automobile 800 is traveling in a traffic network 802, and an operator of the automobile 800 (or a driverless automobile) wishes to reach a goal 804 in the traffic network 802. As can be ascertained, the automobile 800 can take numerous travel routes from its current location to reach the goal 804. Observations can be made over one or more road segments in the region 802 (where the observations can indicate average speeds over the road segments, and can be based upon output of a sensor internal to the automobile 800, output of a sensor from a mobile phone or other mobile computing device, etc.). Using such observations, inferences can be made about costs to be incurred by the automobile 800 when traveling over particular road segments. Based on such inferences, decisions can be made about which road segment the automobile 800 is to immediately take to reach the goal 804 in the shortest amount of time. As additional observations are acquired, both from the automobile 800 and other automobiles in the road network 800, the travel route to the goal 804 can be dynamically updated.

Figure 9:
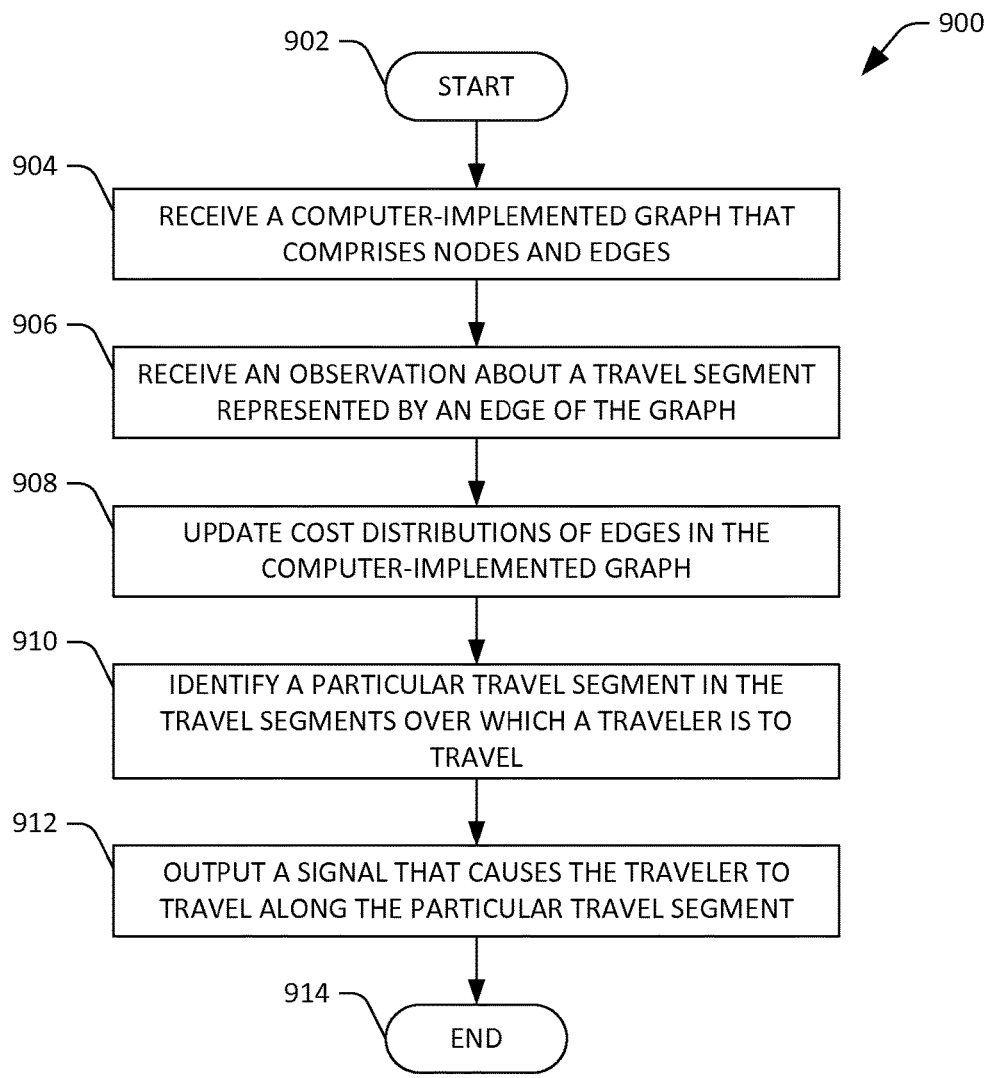
FIG. 9 is a flow diagram that illustrates an exemplary methodology for outputting a signal that causes a traveler to travel along a particular travel segment.
Figure 10:
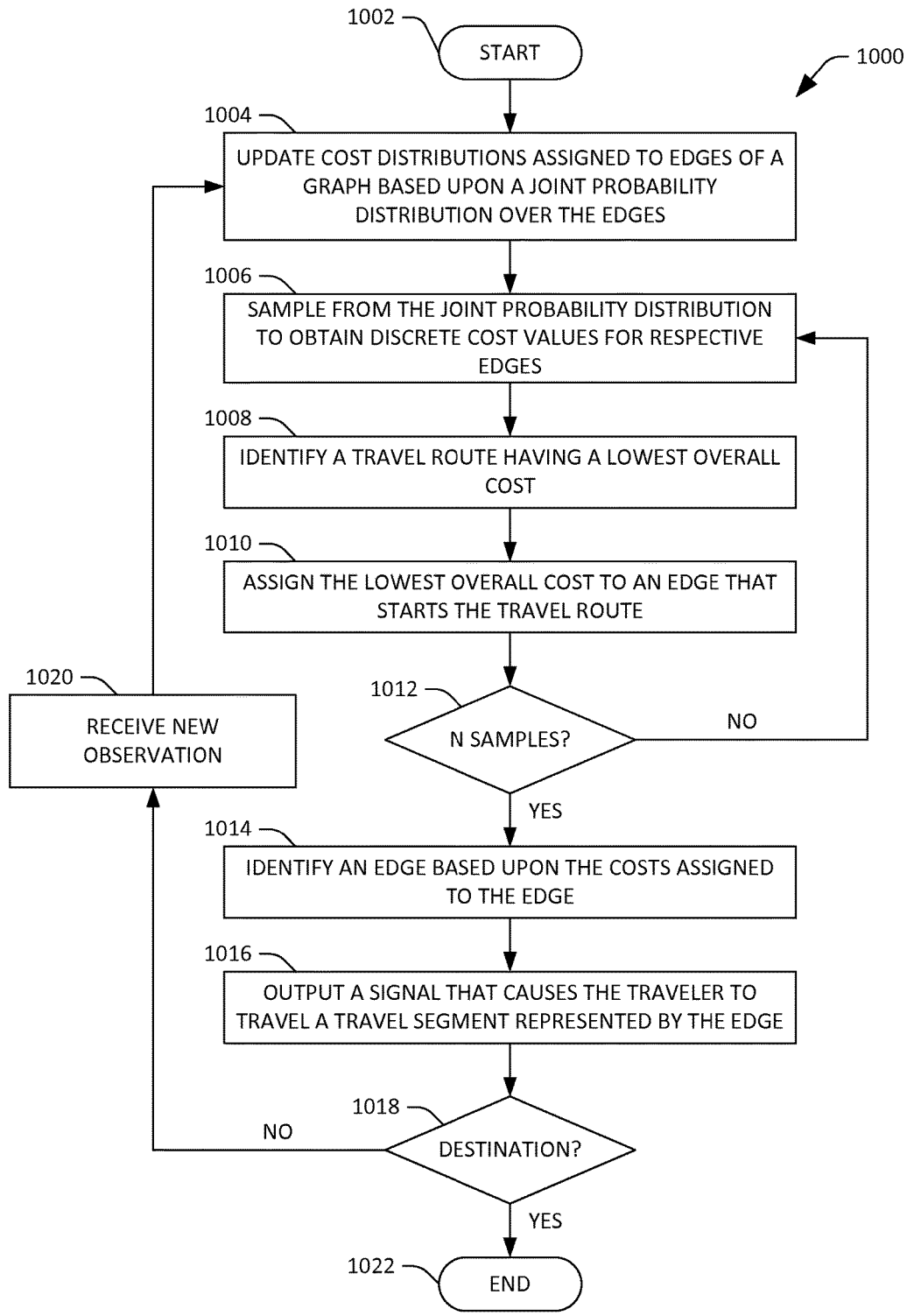
FIG. 10 is a flow diagram that illustrates an exemplary methodology for dynamically updating a travel route provided to a traveler to cause the traveler to reach a destination location.

FIGS. 9-10 illustrate exemplary methodologies relating to inferring costs about travel segments in a region, and dynamically updating a travel route to be taken by a traveler in the region based upon the inferring of the costs. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 9, an exemplary methodology 900 that facilitates outputting a signal that causes a traveler to travel along a particular travel segment is illustrated. The methodology 900 starts at 902, and at 904, a computer-implemented graph that comprises nodes and edges is received. The computer-implemented graph can represent a region over which a traveler can travel. The nodes of the graph can represent respective locations in the region, while the edges can represent travel segments between locations. For example, each edge in the edges can connect a respective pair of nodes in the nodes, and each node in the nodes is connect to at least one other node by a respective edge in the edges. Further, as described above, the edges have respective (potentially unknown) costs assigned thereto, which can be given by cost functions, and modeled as probability distributions. These costs can have a statistical relationship therebetween (e.g., defined by a joint distribution over the costs).

At 906, an observation about a travel segment in the travel segments is received. In an example, the observation can be received from the traveler or a sensor coupled to the traveler. In another example, the observation can be received from another sensor in the region or from another traveler in the region.

At 908, responsive to receiving the observation, respective cost distributions of the edges in the computer-implemented graph are updated based upon the observation and the statistical relationship between the costs. Effectively, uncertainties about costs assigned to the edges can be collapses based upon an observation relating to an edge. At 910, a particular travel segment in the travel segments over which the traveler is to travel is identified, wherein the identifying is based upon the updating of the respective costs of the edges and a destination location of the traveler. At 912, a signal is output to cause the traveler to travel long the particular travel segment. The methodology 900 completes at 914.

Turning now to FIG. 10, an exemplary methodology 1000 for directing a traveler in a particular region is illustrated. The methodology 1000 starts at 1002, and at 1004, probability distributions of costs assigned to edges of a computer-implemented graph are updated based upon a joint probability distribution over the costs. For example, the distributions can be updated based upon an observation about a travel segment in a region. At 1006, the joint probability distribution is sampled from to obtain discrete cost values for respective edges of the graph. At 1008, a travel route is identified, wherein the travel route has a lowest overall cost to the traveler, wherein the travel route includes multiple travel segments (e.g., a travel segment being a segment between locations represented by two nodes in the graph). At 1010, the lowest overall cost determined at 1008 is assigned to an edge that represents the start of the travel route. At 1012, a determination is made regarding whether a sufficient number of samples has been acquired (e.g., the number of samples is greater than some predefined threshold). If more samples are desired, then the methodology returns to 1006. If, at 1012, it is determined that a sufficient number of samples has been acquired, then at 1014 an edge is identified based upon the costs assigned to the edges. For example, an edge having a threshold number of costs assigned thereto, wherein the average of the costs is lowest compared to averages of costs assigned to other edges can be identified. At 1016, a signal is output that causes the traveler to travel a travel segment represented by the edge identified at 1014. Thus, the traveler is moving about in the region. At 1018, a determination is made regarding whether the traveler has reached the destination. If the traveler has not reach the destination, then at 1020, a new observation can be received (e.g., from the traveler) and the methodology 1000 can return to act 1004. The methodology 1000 ends at 1022 when the traveler reaches the destination.

From the foregoing, it is understood that described herein are means for updating a cost distribution for an edge in a computer-implemented graph based upon an observation about a travel segment in a region, wherein the edge represents the travel segment. Also described herein are means for updating cost distributions for other respective edges in the computer-implemented graph based upon the cost distribution for the edge being updated and a statistical relationship over edges (costs) in the computer-implemented graph. Further described herein are means for identifying a travel segment over which a traveler is to travel based upon the cost distributions for the edges in the computer-implemented graph.

Figure 11:
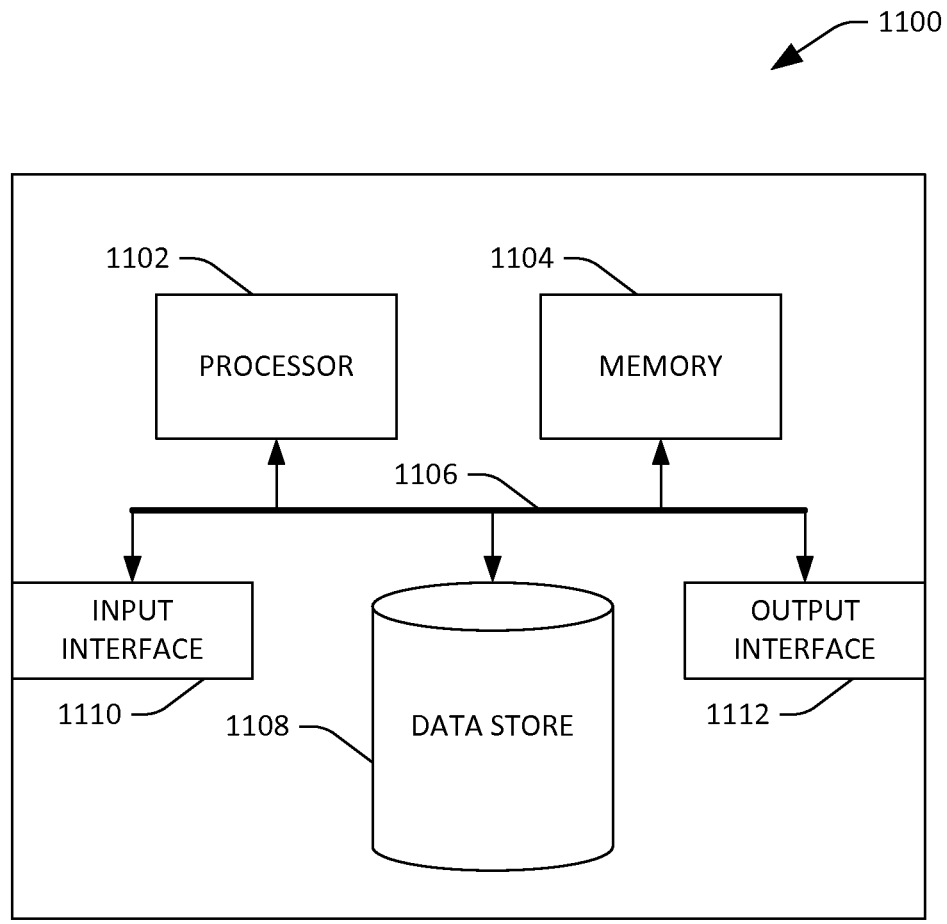
FIG. 11 is an exemplary computing system.

Referring now to FIG. 11, a high-level illustration of an exemplary computing device 1100 that can be used in accordance with the systems and methodologies disclosed herein is illustrated. For instance, the computing device 1100 may be used in a system that infers costs assigned to travel segments in a region. By way of another example, the computing device 1100 can be used in a system that identifies a travel route based upon inferred travel costs. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store a computer-implemented graph, sample values, cost functions, etc.

The computing device 1100 additionally includes a data store 1108 that is accessible by the processor 1102 by way of the system bus 1106. The data store 1108 may include executable instructions, cost functions, a computer-implemented graph, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method executed by a processor of a computing device, the method comprising:
   receiving a computer-implemented graph that comprises nodes and edges, the computer-implemented graph representative of a region over which a machine is able to travel, the nodes representative of respective locations in the region, the edges representative of travel segments between locations, wherein each edge in the edges connects a respective pair of nodes in the nodes, each node in the nodes connected to at least one other node by a respective edge in the edges, the edges have respective distributions over costs assigned thereto, and the respective costs have a statistical relationship therebetween;
   receiving data from a sensor, the data being about a travel segment in the travel segments;
   responsive to receiving the data, updating the respective distributions over the costs of the edges in the computer-implemented graph based upon the data and the statistical relationship;
   identifying a particular travel segment in the travel segments over which the machine is to travel, the identifying based upon the updating of the respective distributions over the costs of the edges and a destination location of the machine; and
   responsive to identifying the particular travel segment, directing the machine to travel along the particular travel segment in the travel segments, wherein directing the machine to travel along the particular travel segment comprises outputting a signal that causes the machine to travel along the particular travel segment in the travel segments.

2. The method of claim 1, wherein the machine comprises the processor.

3. The method of claim 2, wherein the respective distributions over the costs of the edges are updated in the computer-implemented graph as the machine travels in the region.

4. The method of claim 1, the machine being one of an airplane, a water vessel, a spacecraft, a drone, a robot, or an automobile.

5. The method of claim 1, the machine comprises the sensor.

6. The method of claim 1, another machine in the region comprises the sensor.

7. The method of claim 1, the statistical relationship being a joint probability distribution over the costs.

8. The method of claim 7, the joint probability distribution being a Gaussian distribution.

9. The method of claim 7, wherein identifying the particular travel segment in the travel segments over which the machine is to travel comprises:
   sampling from the joint probability distribution to acquire respective discrete cost values for the edges;
   identifying, from amongst possible travel routes from a current location of the machine to the destination location, a travel route that has a lowest aggregate cost from amongst the possible travel routes, the travel route being over multiple travel segments; and
   identifying the particular travel segment based upon the identifying of the travel route, wherein the particular travel segment is a first travel segment in the travel route that begins at the current location of the machine.

10. The method of claim 9, wherein identifying the particular travel segment in the travel segments over which the machine is to travel further comprises:
   sampling from the joint probability distribution multiple times to acquire multiple discrete cost values for each edge in the edges;
   for each edge in the edges, computing a respective average cost value; and
   identifying the travel route based upon respective average cost values for the edges.

11. The method of claim 1, further comprising repeating the acts of:
   receiving data from the sensor;
   updating the respective costs of the edges;
   identifying a particular travel segment in the travel segments; and
   outputting a signal that directs the machine to travel along the particular travel segment in the travel segments until the machine reaches the destination location.

12. The method of claim 1, the statistical relationship is a function of time.

13. A computing system comprising:
   a processor; and
   memory that stores instructions that, when executed by the processor, cause the processor to perform acts comprising:
      receiving a computer-implemented graph that comprises nodes and edges, the computer-implemented graph representative of a region over which a machine is able to travel, the nodes representative of respective locations in the region, the edges representative of travel segments between locations, wherein each edge in the edges connects a respective pair of nodes in the nodes, each node in the nodes connected to at least one other node by a respective edge in the edges, the edges have respective distributions over costs assigned thereto, and the respective costs have a statistical relationship therebetween;
      receiving data from a sensor, the data being about a travel segment in the travel segments;
      responsive to receiving the data, updating the respective distributions over the costs of the edges in the computer-implemented graph based upon the data and the statistical relationship;
      identifying a particular travel segment in the travel segments over which the machine is to travel, the identifying based upon the updating of the respective distributions over the costs of the edges and a destination location of the machine; and
      responsive to identifying the particular travel segment, directing the machine to travel along the particular travel segment in the travel segments, wherein directing the machine to travel along the particular travel segment comprises outputting a signal that causes the machine to travel along the particular travel segment in the travel segments.

14. The computing system of claim 13, the machine being one of an airplane, a water vessel, a spacecraft, a drone, a robot, or an automobile.

15. The computing system of claim 13, the machine comprises the sensor.

16. The computing system of claim 13, another machine in the region comprises the sensor.

17. The computing system of claim 13, the statistical relationship being a joint probability distribution over the costs.

18. The computing system of claim 17, the joint probability distribution being a Gaussian distribution.

19. The computing system of claim 18, wherein identifying the particular travel segment in the travel segments over which the machine is to travel comprises:
   sampling from the joint probability distribution to acquire respective discrete cost values for the edges;
   identifying, from amongst possible travel routes from a current location of the machine to the destination location, a travel route that has a lowest aggregate cost from amongst the possible travel routes, the travel route being over multiple travel segments; and
   identifying the particular travel segment based upon the identifying of the travel route, wherein the particular travel segment is a first travel segment in the travel route that begins at the current location of the machine.

20. A computer-readable storage medium comprising instructions that, when executed by a processor, cause the processor to perform acts comprising:
   receiving a computer-implemented graph that comprises nodes and edges, the computer-implemented graph representative of a region over which a machine is able to travel, the nodes representative of respective locations in the region, the edges representative of travel segments between locations, wherein each edge in the edges connects a respective pair of nodes in the nodes, each node in the nodes connected to at least one other node by a respective edge in the edges, the edges have respective distributions over costs assigned thereto, and the respective costs have a statistical relationship therebetween;
   receiving data from a sensor, the data being about a travel segment in the travel segments;
   responsive to receiving the data, updating the respective distributions over the costs of the edges in the computer-implemented graph based upon the data and the statistical relationship;
   identifying a particular travel segment in the travel segments over which the machine is to travel, the identifying based upon the updating of the respective distributions over the costs of the edges and a destination location of the machine; and
   responsive to identifying the particular travel segment, directing the machine to travel along the particular travel segment in the travel segments, wherein directing the machine to travel along the particular travel segment comprises outputting a signal that causes the machine to travel along the particular travel segment in the travel segments.

* * * * *